Aug. 13, 1940.  J. D. MORGAN ET AL  2,211,627
GAS ANALYZING APPARATUS
Filed April 16, 1937   2 Sheets-Sheet 1

INVENTORS
JOHN D. MORGAN
ALAN P. SULLIVAN
BY
Edmund J. Borden
ATTORNEY

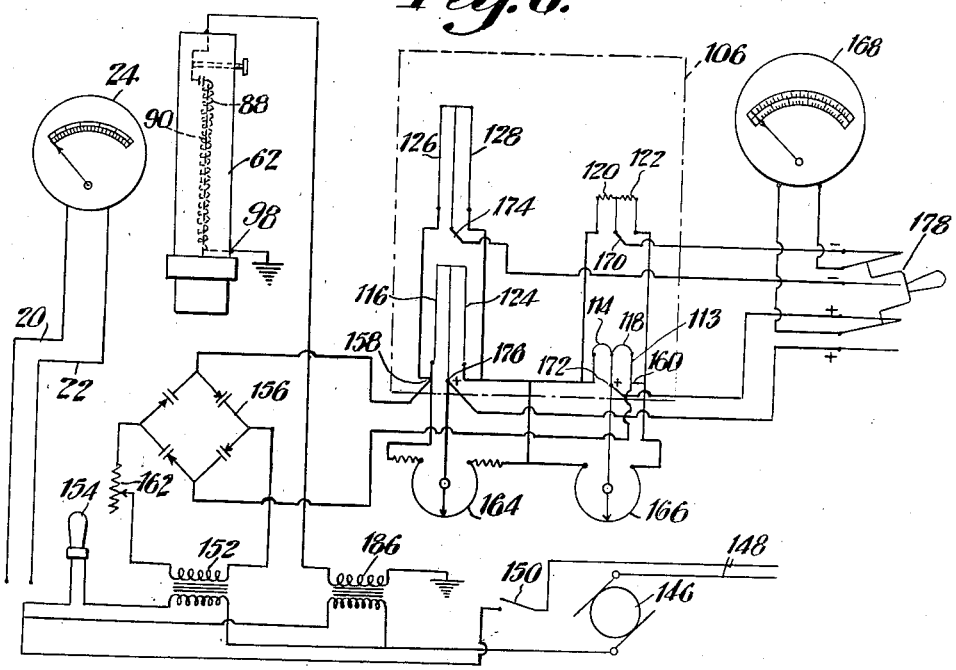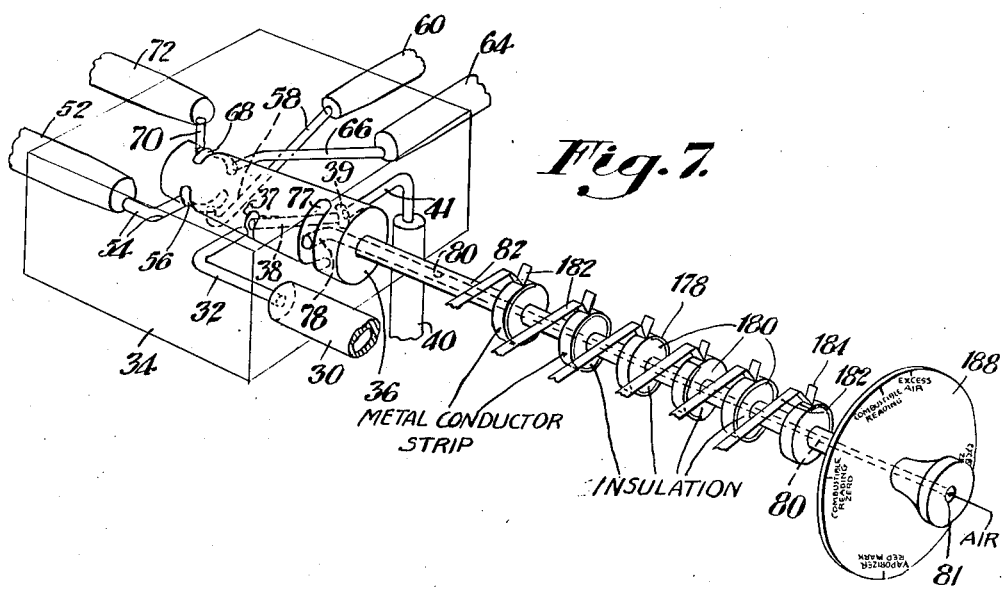

Patented Aug. 13, 1940

2,211,627

UNITED STATES PATENT OFFICE 2,211,627

GAS ANALYZING APPARATUS

John D. Morgan, South Orange, N. J., and Alan P. Sullivan, Jackson Heights, N. Y., assignors to Power Patents Company, Hillside, N. J., a corporation of Maine Application April 16, 1937, Serial No. 137,168

2 Claims. (Cl. 23—255)

This invention relates to the analysis of gases, and more particularly to apparatus adapted for checking the operating efficiency of domestic space heating furnaces and Diesel engines in accordance with the temperature and composition of gaseous products of combustion therefrom. The apparatus of the present invention is a continuation in part of and improvement on that described in our copending applications, Serial No. 688,972, filed September 11, 1933, which is now U. S. Patent No. 2,073,249, granted March 9th, 1937; and Serial No. 755,692, filed December 3, 1934.

The primary object of the present invention is to provide improved apparatus which shall be adapted to use in adjusting all such combustion operations to a condition of optimum operating efficiency with respect to the particular combustion apparatus and fuel under test. A feature of the invention which is designed to accomplish the aforementioned object consists in apparatus adapted for making substantially simultaneous measurements of the factors of flue gas temperature and amounts of unburned combustible and of excess air in the flue gas at several points on the load curve of the furnace or engine between high and low load. The operation of the combustion apparatus under test can then be regulated in accordance with such measurements by proportioning the fuel and air supplies to the furnace or engine so that the temperature of the products of combustion is at a minimum point with the combustion apparatus set at normal operating conditions to meet an average load.

Domestic heating furnaces and Diesel engines normally operate best under a condition of over-ventilation wherein the products of combustion leaving the combustion chamber may contain small amounts of unburned combustible and relatively large amounts of excess air.

A particular object of the present invention is to provide apparatus whereby even an unskilled operator can obtain accurate and substantially simultaneous measurements of the temperature and composition of gaseous products of combustion containing both relatively large amounts of excess air and relatively small amounts of unburned combustible.

A combustion analyzer which is calibrated for accurately measuring small amounts (for example, under 1%) of unburned combustible in flue gas, can not normally be used without re-calibration for measuring large amounts (100–150%) of excess air. This is because of the wide variations in temperatures which are developed on the one hand in burning small amounts of unburned combustible contained in a flue gas sample, and on the other hand in burning the large volumes of excess air which may be carried by the same flue gas; and because it is difficult to calibrate millivoltmeters or light sensitive instruments to record accurately over a wide range of temperature.

Accordingly, another object of the present invention is to provide apparatus which shall be operative for making substantially simultaneous quantitative analyses of flue gases by combustion both for a very low content of unburned combustible and for a very large content of excess oxygen or air.

The apparatus of the present invention has been particularly designed for making continuous measurements of the temperature of flue gas adjacent the point at which it leaves the combustion chamber and for the simultaneous removal of a sample stream of the flue gas at the point of temperature measurement, division of the stream into two uniformly proportional portions, and quantitative analyses of each portion of flue gas by combustion. The analysis of one portion is effected after addition thereto of a measured uniform amount of vaporized liquid fuel for the purpose of determining the excess air therein; while a substantially simultaneous analysis is made of the other portion of flue gas after addition of air thereto to determine the amount of unburned combustible therein.

The invention contemplates taking such flue gas temperature measurements and simultaneous measurements of unburned combustible and of excess oxygen in the flue gas while operating the combustion apparatus under test to meet varying conditions of heat demand, followed by adjustment of the air and fuel supplies to the combustion apparatus so as to reduce the temperature of the outgoing flue gas to a minimum point while burning fuel in amount sufficient to meet a normal or average load on the apparatus.

The invention will now be more particularly described by reference to the accompanying drawings, which illustrate apparatus embodying a preferred form of the invention.

In the illustrated apparatus—

Fig. 6 is a wiring diagram; and

Fig. 7 shows in perspective a preferred design for the multi-apertured gas flow regulating valve and the multiple switch operatively associated therewith, together with the orifice block within which the valve is rotatably journaled.

Figure 1:
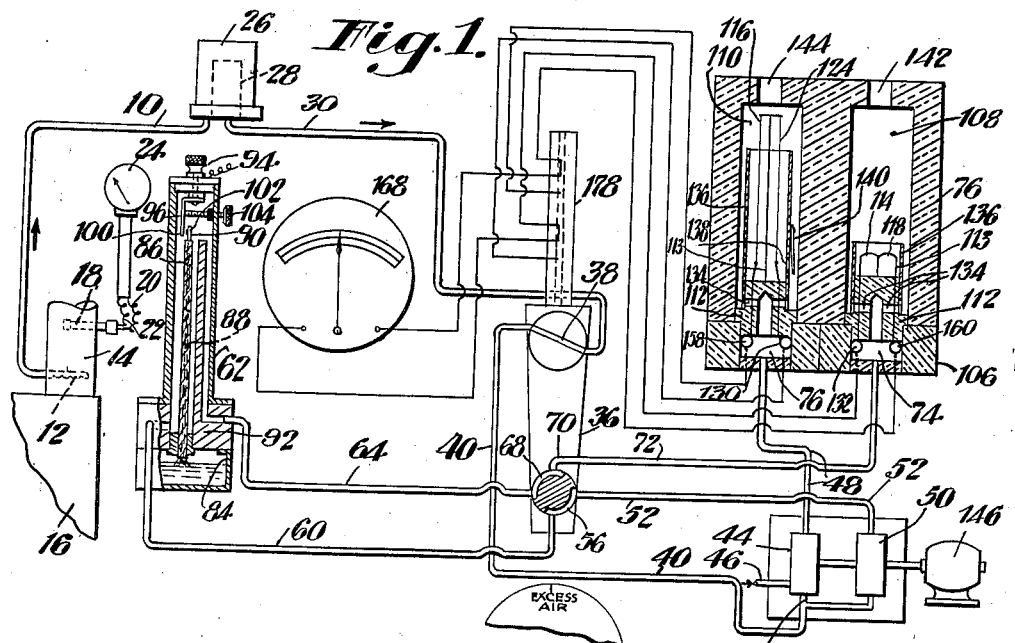
Fig. 1 is a diagrammatic flow sheet of the apparatus assembly, showing the gas analyzer unit and the fuel vaporizer in section and the other parts of the apparatus in elevation.

Fig. 1 of the drawings illustrates an application of the invention to the regulation of combustion in a domestic type heating furnace, but it will be readily understood that the invention is equally applicable to the regulation of combustion in Diesel engines and similar combustion units.

Referring to Fig. 1, numeral 10 designates a gas sampling tube having an apertured gas sampling nozzle 12 at its inlet end, said nozzle being adapted for introduction in the waste gas flue 14 of a furnace 16 for securing a continuous sample of the furnace flue gas to be analyzed. A thermocouple 18 is mounted in flue 14 closely adjacent the gas sampler nozzle 12, and lead wires 20 and 22 connect the thermocouple 18 to a millivoltmeter 24 which is calibrated for measuring the temperatures of the flue gases in flue 14 at approximately the point where the flue gas sample is taken.

The discharge end of sampling tube 10 is ported out through an L-fitting into a gas filter and liquid separator 26. Filter 26 is preferably filled with copper filings, cotton, glass wool, and/or other dry filtering material, and the filter design includes a baffle 28 around which the gas passes before leaving the filter through an L-fitting and tube 30 on its way to the gas analyzing apparatus. Tube 30 communicably connects the interior of filter 26 with an aperture 32 in an orifice block 34. A multi-apertured gas flow regulating valve 36 is rotatably journaled in block 34 (Fig. 7). With the valve set in the position shown diagrammatically in Fig. 1 and in Fig. 7 for analyzing the flue gases quantitatively for excess air, all of the sample of flue gases which is conducted to the aperture 32 in the orifice block from the filter 26 flows from aperture 32 into a peripheral groove 37. From groove 37 the gas flows through an orifice 38 in the valve 36 into another groove 39 in the valve periphery and thence through another aperture 41 in block 34 into a conduit 40 through which the gas sample passes to a T-fitting 42 where the gas stream is divided into two uniformly proportional portions. From the T-fitting 42 one of the portions of flue gas passes into the suction side of a pump 44, which is illustrated as a rotary pump (i. e., a pump with a rotary piston). Pump 44 has an air inlet aperture 46 communicating with its suction side, by means of which air in measured amount is sucked into the pump chamber from atmosphere along with the portion of flue gas and mixed within the pump prior to discharge of the flue gas air mixture through a tube 48 communicating with the discharge or pressure side of the pump. This air is added to insure sufficient air to completely burn any unburned combustible in the gas sample.

The second portion of flue gas is drawn from the T-fitting 42 into the suction side of a second rotary piston pump 50, and after having its pressure raised by the pump is discharged into a tube 52 which communicably connects with another aperture 54 in the orifice block 34. With the valve 36 set in the position illustrated in Figs. 1 and 7, the aperture 54 in the orifice block communicably connects with a groove 56 in the side wall of valve 36 and at the same time groove 56 communicably connects with another aperture 58 in orifice block 34. Aperture 58 in turn communicates with a tube 60 whereby the sample of flue gas which has passed through the pump 50 is conducted into the inlet port of a thermostatically controlled wick vaporizer 62. In flowing through the vaporizer 62 the gas sample is carbureted by admixture therewith of liquid fuel vapors, and from the discharge port of the vaporizer the flue gas-fuel vapor mixture is returned to the valve 36 through a pipe 64 and an aperture 66 in the orifice block 34. With the valve 36 set in the position illustrated in Figs. 1 and 7 aperture 66 communicably connects with a groove 68 in the side wall of valve 36 and at the same time groove 68 communicably connects with another aperture 70 in orifice block 34. From aperture 70, the mixed flue gas-fuel vapor mixture passes through a tube 72 into a gas inlet chamber 74 which is located on one side of gas analyzer block 76. While the sample of gas which has passed through the vaporizer 62 (Fig. 1) enters the chamber 74 in the analyzer, the other sample of gas which has been admixed with air during its passage through pump 44 simultaneously enters a second chamber 76 in the analyzer from the tube 48.

With the valve 36 turned counter-clockwise 75° from the position shown in Fig. 1 to a new position (Fig. 5) which is used for calibrating the zero position of the side of the analyzer which is adapted for analyzing for excess air, the gas which is handled by the pump 50 by-passes the vaporizer 62 and is conducted through aperture 54 and valve groove 68 directly to aperture 70 in the block 34, and thence through pipe 72 into analyzer inlet chamber 74. However, with the valve set in the position illustrated in Fig. 5, it is air rather than flue gas which enters the chamber 74. In other words, with the valve set in the position illustrated in Fig. 5 the aperture 38 in the valve no longer communicates with the flue gas supply pipe 30, but the inlet side of the pipe 40 communicably connects through a semicircular groove 77 and radial aperture 78 in valve 36 with a central bore 80 in a stem 82 of valve 36, in which position air from atmosphere enters the bore 80 from atmosphere at point 81 under the suction of pumps 44 and 50.

Figures 2, 3, 4, 5:
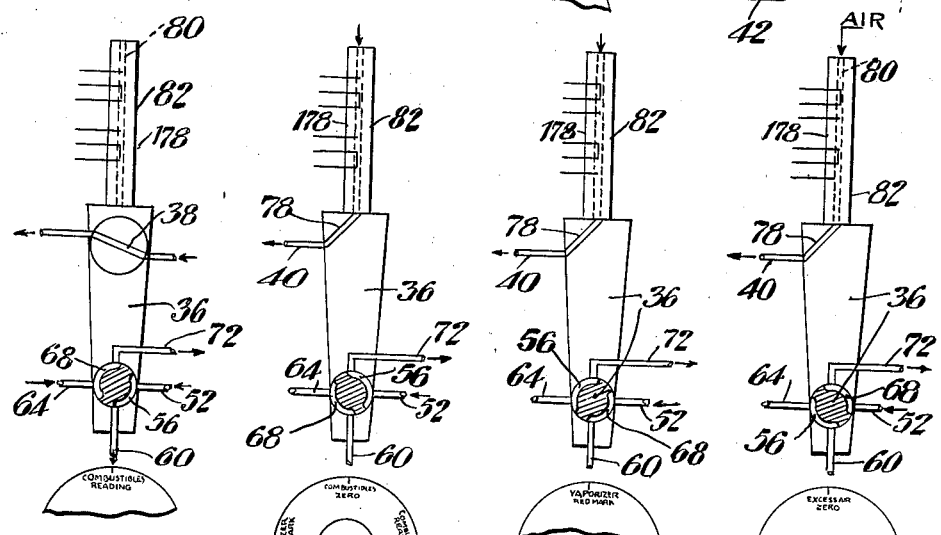
Figs. 2, 3, 4 and 5 illustrate alternative positions of the apertured gas flow regulating valve and combined multiple electric switch, which have been illustrated in Fig. 1 in the setting employed for measuring the amount of excess air in the flue gas under analysis.

With the valve 36 turned counter-clockwise 90° from the position which is shown in Fig. 5 to a new position shown in Fig. 4 which is used for calibrating the analyzer and for setting the vaporizer 62 for measuring full scale deflection of the millivoltmeter when set for analyzing for excess air, it will be noted that air still enters the pump 50 through groove 77 and aperture 78 in the valve and tube 40. In this case, the air passes from the discharge side of pump 50 through groove 68 in the valve and thence through the vaporizer where liquid fuel vapor is admixed therewith prior to conducting the air-vapor mixture back through groove 56 in the valve and pipe 72 to chamber 74.

With the valve 36 turned another 90° counter-clockwise from the position shown in Fig. 4 to a new position (Fig. 3) which is used for calibrating the zero position of the analyzer when set for analyzing for combustible, air still enters the tube 40 through the air entrance bore 80 and valve aperture 78 and a portion of this air is passed by the pump 44 into the analyzer chamber 76.

In Fig. 2, still another position of the valve 36 is shown with the valve turned about 75° counter-clockwise from the position illustrated in Fig. 3. With the valve in the position illustrated in Fig. 2, the analyzer is set for analyzing for combustible in the flue gas, and it will be noted that the gas flow connections are the same that are operative with the valve in the position shown in Fig. 1. In other words, the only difference which is effected by the small change in the valve position as shown in Fig. 2 over that shown in Fig. 1 is in the setting of an electrical control switch 178 which is mounted on stem 82 of the valve and which will be more fully described hereinafter in connection with the description of the electrical circuit.

The apparatus is normally calibrated by first setting the valve 36 in the position illustrated in Fig. 3 and checking the zero position of the combustible side of the analyzer, then checking the zero position of the excess air side of the analyzer by turning the valve 180° in either direction to the position shown in Fig. 5, and then turning the valve 90° counter-clockwise to the position shown in Fig. 4 to calibrate the vaporizer. As shown in the drawings, the position of the valve when set for obtaining a reading of the amount of combustible (Fig. 2) is 30° counterclockwise from the position of the valve (Fig. 1) when set for a reading on the amount of excess air in the gas under analysis. The groove 77 in the periphery of the valve is cut long enough to register with aperture 41 during 180° of valve throw. Grooves 56 and 68 are each cut long enough to register with one of apertures 54, 58, 66 and 70 over 105° of valve throw; and grooves 37 and 39 are cut long enough to register with apertures 32 and 41 respectively over 30° of valve throw.

The vaporizer 62 is mounted over a liquid fuel reservoir 84 from which liquid is elevated into the vaporizer by a wick 86 which extends up centrally through the vaporizer. An electric resistance heating coil 88 is mounted integrally with that portion of the wick which extends into the vaporizer, and the wick is supported within the vaporizer by a bi-metallic strip 90 which is pivotally supported coaxially of the vaporizer and coil 88 by an apertured plug closure 92 at the base of the vaporizer between the vaporizer and the reservoir 84. It will be understood that the lower end of the wick dips into the liquid fuel in reservoir 84. One end of coil 88 is connected to a terminal post 94 located at the upper end of the vaporizer, and the other end of coil 58 is connected to strip 90. An insulating wrapping separates strip 90 and coil 88 except at the point of connection. Bi-metallic strip 90 forms one contact element of a thermostatic switch of which a spring metal strip 96 constitutes the other element. Strips 96 and 90 form a sensitive automatic switch in a low voltage electric circuit including coil 88, terminal 94, and a second grounded terminal post 98 to which the pivoted end of strip 90 is connected.

The temperature which is maintained in vaporizer 62 controls the amount of fuel vapor which is admixed with the portion of flue gas flowing into the analyzer chamber 74 with the valve 36 set in the positions illustrated in Figs. 1, 2, and 4. The spring strip 96 is supported so that its free contact end 100 tends to hold contact with bi-metallic strip 90 at temperatures above the maximum temperature at which it is desired to operate vaporizer 62, while bi-metallic strip 90 is calibrated so that its free contact end 102 tends to warp to the right away from the contact end 100 of strip 96 when the temperature developed by the vaporizer heating circuit exceeds a predetermined amount. An adjustment screw 104 is provided with an insulated end whereby the free end of strip 96 is prevented from moving in the direction of warp of strip 90 when the vaporizer temperature exceeds that at which the switch is designed to break circuit.

The gas analyzer unit 76 is supported on an orifice block 106 and embodies a pair of spaced tubular combustion cells 108 and 110. The cells are embodied in a unitary housing comprising a block of dielectric heat insulating material such as Bakelite. Centrally apertured dielectric plugs 112 form quickly detachable bottom closures for each of the cells 108 and 110 and extend upwardly into the respective cells, and each of these plugs in turn carries metal conductor catalyst supporting rods 113 which also form the connecting leads for catalytic heating wires 114 and 116 which are mounted respectively in the cells 108 and 110 in the path of gas and air flowing therethrough. The cell 108 is adapted to function as an excess air analyzer, and as illustrated in Fig. 6, the catalyst wire 114 forms one leg of a Wheatstone bridge of which another non-catalyst leg is designated by the numeral 118. Legs 114 and 118 are mounted in vertical parallel relation within the cell 108. The other two legs of the bridge are designated in Fig. 6 by the numerals 120 and 122. Since the cell 108 is designed to measure amounts of air up to 150% excess in the products of combustion under analysis, it is essential that the catalyst 114 be relatively insensitive as compared with the catalyst 116 which is employed in the combustible analyzer 110. Experience has shown that the catalyst 114 should consist of a wire of platinum-iridium (5%) alloy ¼ inch in length by .005" diameter, while the wire 118 should have the same composition, diameter and length as the wire 114 and should be covered with a thin gold plating to render it non-catalytic. Gold plating is chosen for wire 118 because it will stand up at operating temperatures below 1400° F., and its use insures ease of balancing of the conductivity of the wires 118 and 114 when operating in air.

The catalyst wire 116 in the cell 110 must be many times as sensitive as the catalyst wire 114 in cell 108 in order to measure quantitatively small amounts (.02–.03%) of combustible in the flue gases under analysis, and accordingly this wire is constructed of substantially pure platinum having a length of about 1½" and diameter of about .0035". As shown in Fig. 6, wire 116 forms one leg of a second Wheatstone bridge circuit, said second Wheatstone bridge also embodying a non-catalyst leg 124 which is likewise mounted within the cell 110, the other two legs of the bridge being indicated in Fig. 6 by the numerical designations 126 and 128. The non-catalytic leg 124 is preferably constructed of platinum rhodium (5%) alloy wire of the same length as catalyst 116 and having a diameter of about .003", plated with a nickel oxide coating of about .00005 inch thickness. Nickel oxide is employed for coating the wire 124 in the cell 110 for the reason that this cell is designed to develop temperatures of about 1500° F., at which temperature nickel oxide is preferred as a coating over gold. The nickel oxide coated wire 124 has a darker color and more heat radiating capacity but a smaller diameter than the opposite platinum catalyst leg of the bridge in order to counterbalance the effect that wires coated with nickel oxide operate at a lower temperature in air than bare platinum wire when in air, and at a higher temperature than platinum when in an atmosphere containing $CO_2$, at the normal operating temperature range of the catalyst. As shown in Fig. 1 the supporting metal posts for the catalyst and non-catalytic legs of the respective bridges which are mounted within the cells 108 and 110 form the conjugate connections for the bridge through terminal posts 160—132, 130—158.

The central apertures in each of the plug closures 112 at the lower end of each of the cells 108 and 110 communicate at their lower ends with the respective gas supply chambers 74 and 76, and at their upper ends communicate through radial apertures 134 with the interiors of the respective combustion chambers. Also each of the catalytic wires in the respective chambers is enclosed within a cylindrical shield 136 which is open at the top. The shield 136 in the combustible analyzer cell 110 also has an aperture 138 therein about opposite the lower end of the catalyst through which gas flowing around the shield can diffuse and pass through the shield into contact with the lower end of the catalyst. A bimetallic strip thermostat 140 is hung on the outside wall of the shield 136 in cell 110 in position to control the opening and closing of the aperture 138 in accordance with the temperature which is developed within the cell 110.

Openings 142 and 144 are provided in the analyzer block 76 at the top of each of the cells 108 and 110 respectively by which unburned gases and products of combustion may escape from the analyzer cells to atmosphere.

The rotors of pumps 44 and 59 are mounted on the drive shaft of a small constant speed electric motor 146 which is powered by current flowing through an electric circuit 148 and controlled by a panel mounted switch 150. The main circuit leads from the switch 150 are connected across the brushes of the motor 146, and from these same leads the electrical power is taken for heating the catalyst wires 114 and 116 of the Wheatstone bridges. The voltage of the current used for heating the catalyst elements of the bridges is reduced by means of a transformer 152 to an approximate value of 5 to 6 volts. To accomplish this, the A. C. current from the main supply circuit 148 flows through a ballast or constant current glow lamp 154 to the high voltage side of the transformer 152, and from the low voltage side of the transformer the current flows to the primary side of a full wave rectifier 156 which is in the form of a bridge (Fig. 6). The rectified D. C. current of about 1.75 amperes, is taken from secondary points on the rectifier which are connected to points 158 and 160 of the respective Wheatstone bridges. The current flowing through the secondary circuit of the transformer 152 passes through a variable resistance or rheostat 162, and the current flowing through each of the Wheatstone bridges is controlled by zero adjuster rheostats 164 and 166 which are connected in shunt circuit respectively across the catalyst legs 116 and 114. The fixed resistances 126, 128, 120 and 122 are preferably mounted on spools secured within the analyzer block 76, and may be balanced as to dimensions and composition with the corresponding legs 116, 124, 114, and 118. The rheostats 164 and 166 are employed for adjusting the current supplies to each of the bridges embodying the catalyst wires 116 and 114, respectively.

A millivoltmeter 168 is provided for the purpose of measuring any differential current flow developed in the Wheatstone bridges as between the catalyst and the non-catalytic legs. The millivoltmeter 168 is provided with two scales, one of which is calibrated to measure percentages of excess air present in the gas stream flowing through the cell 108, while the other scale is designed to measure small percentages of combustible in the gas stream flowing through the cell 110. The voltmeter is connected alternatively either to points 170 and 172 of the Wheatstone bridge having its active and inactive legs mounted in the cell 108, or to points 174 and 176 of the Wheatstone bridge having its active and inactive legs mounted in the combustion cell 110. This alternative connection of the voltmeter to either one or the other of the two Wheatstone bridges is effected through a doublepole-double throw switch 178 which is illustrated diagrammatically in Fig. 6, and a preferred mechanical design of which is illustrated in Fig. 7. As shown in Fig. 7, the essential parts of the switch 178 comprise 6 disks 180 of insulating material rotatably journaled on stem 82 of valve 36, each disk 180 having a split metal conductor ring mounted thereon, and each disk contacting at its periphery a spring contact member 182.

The rheostat 166 is provided for the purpose of balancing the Wheatstone bridge having its active leg in cell 108. The rheostat 164 provides a similar adjustment for the bridge embodying catalyst 116.

Current for heating the coil 88 of the vaporizer 62 is taken from a second transformer 186 in the main circuit.

In the ordinary operation of the apparatus a dial 188 which is journaled on the front or panel end of valve stem 82 may be first turned to move the valve 36 to the position shown in Fig. 5 for the purpose of calibrating the excess air side of the analyzer on air admitted to the apparatus through the bore 80 in the valve stem. The dial 188 may next be turned to the position illustrated in Fig. 4 in order to permit calibrating and adjustment of the excess air analyzer and of the vaporizer so that the indicator pointer of the millivoltmeter 168 will remain on the millivolt scale at about the maximum swing from the zero position of the scale when vaporizing sufficient liquid to give a full scale deflection of the voltmeter when the same amount of liquid is vaporized in a gas containing approximately 150% of excess air. The dial 188 is next turned to the position shown in Fig. 3 for the purpose of calibrating the combustible side of the analyzer on air. The dial may then be turned to either of the positions shown in Fig. 1 or 2, depending upon whether measurements are to be taken of the amount of excess air in the flue gas, or the amount of unburned combustible in the flue gas. The analyzer when properly calibrated is adapted for taking a substantially simultaneous reading of excess air and combustible, since both cells 108 and 110 are operating continuously and all that is necessary to take a reading of the operation in one cell or the other is to connect the voltmeter 168 with the Wheatstone bridge in which the active catalyst leg in the cell under examination is embodied.

After calibrating both sides of the analyzer the sampling tube 12 is placed in the flue of the furnace, and with the valve 36 and switch 178 in position for analyzing for excess air (Fig. 1 with the vaporizer 62 in the gas circuit to analyzer chamber 108), a continuous sample of the flue gas is drawn at a substantially uniform rate through the filter 26 into T-fitting 42, from which one portion of the sample flows through pump 50 into vaporizer 62, and a continuous sample of the gas admixed with vaporized fuel flows from the vaporizer through analyzer cell 108. Simultaneously another portion of the gas sample is conducted from T-fitting 42 through pump 44 where it is admixed with air, and from pump 44 a continuous sample of the gas admixed with air passes into and through analyzer cell 110.

The gas samples enter both analyzers 108 and 110 under a constant pressure and at a constant rate. All of the excess air in the gas sample entering analyzer 108 is burned therein, after which the gas exhausts through passage 94. Similarly, all of the unburned combustible in the gas-air mixture entering analyzer 110 is burned therein before the gas is exhausted to atmosphere. The catalytic combustion which occurs in the analyzer cells 108 and 110 increases the temperatures of the respective catalyst wires 114 and 116, thereby reducing the current flow through said wires and upsetting the balance of the respective bridges in which said catalyst wires are embodied. With the switch 178 connecting the voltmeter 168 in circuit with the Wheatstone bridge embodying catalyst 114 as a leg, the increased temperature which is developed on the catalyst wire 114 is measured on the excess air scale of the millivoltmeter in terms of percentage excess air in the flue gases. With the switch 178 thrown in the opposite position to incorporate voltmeter 168 in circuit with the Wheatstone bridge embodying catalyst wire 116 as a leg, the increased temperature which is developed on the catalyst 116 is measured on the combustible scale of the voltmeter in terms of percentage combustible in the flue gases.

Prior experience has shown that great care must be taken in choosing the type of fuel which is added to a sample of flue gas for the purpose of burning out any excess air in a combustion analyzer. Hydrocarbon fuels are unsatisfactory for this purpose because they develop such high temperatures on combustion that cracking reactions generally occur, with resultant erroneous readings for excess air by reason of incomplete combustion reactions and waste of part of the heat developed in promoting secondary and endothermic reactions. Gases such as hydrogen are also unsatisfactory for analyzing flue gas for excess air, apparently as a result of the fact that hydrogen occludes in the pores of metal parts of the analyzer and of the catalyst. Oxidized hydrocarbons of low calorific value such as methanol can be used satisfactorily for analyzing amounts of excess air in the flue gas within the range normally contemplated in the practise of the present invention, provided that the supply of vaporized methanol is regulated so as to effect complete combustion of the air while developing temperatures in the catalyst within the measuring range of the analyzer. Other oxidized hydrocarbons may be employed in place of methanol provided that their calorific value lies in the range of from 5600 to 7600 gram calories per gram. For example, acetone and ethyl acetate and mixtures of methanol and ethyl acetate have been found to be satisfactory fuels adapted for use in the vaporizer 62. With fuels of the type indicated the operating temperature of the vaporizer normally lies in the range 90° F.–115° F. when flowing therethrough unheated flue gas at a rate of 50–100 cu. in. per minute over an exposed wick surface not substantially exceeding 1 sq. in. in area.

The invention having been thus described, what is claimed as new is:

1. In a gas analyzer having a combustion cell, a Wheatstone bridge electric circuit embodying a catalyst wire leg and a non-catalyst wire leg mounted in said cell in parallel vertical position, means for delivering gas to be analyzed at a controlled rate to said cell, the combination with said combustion cell of means for directing the gas over the catalyst and non-catalyst legs at a uniform rate comprising a cylindrical shield disposed around the catalyst and non-catalyst legs apertured in a plane adjacent the upper end of each leg for affording uniform access of gas to both legs, there being a lower aperture in said shield in approximately the plane of the lower portion of the legs, together with a bimetallic strip thermostat valve for controlling the opening and closing of said aperture in accordance with the temperature obtaining in the combustion cell.

2. In a gas analyzer, a vertically disposed combustion chamber, means for passing a continuous stream of gas to be analyzed at a controlled rate upwardly through the chamber, a cup-shaped shield mounted centrally within the chamber with its base and side walls positioned in baffling relation to the stream of gas flowing upwardly therethrough, said shield being provided with an aperture adapted to afford access of gas to the interior thereof, a Wheatstone bridge electric circuit embodying a catalyst wire leg and a non-catalyst wire leg of approximately balanced electrical conductivity mounted in closely spaced parallel relation within said cup, and a valve member mounted in operative position to vary the flow of gas through said shield aperture.

JOHN D. MORGAN.
ALAN P. SULLIVAN.